(12) United States Patent
Fielden et al.

(10) Patent No.: US 11,312,431 B2
(45) Date of Patent: Apr. 26, 2022

(54) CRASH SHOCK ABSORBING DEVICE

(71) Applicant: MAG USA Inc., Clinton, TN (US)

(72) Inventors: Robert Fielden, Maryville, TN (US); Alexandre Khavronine, Knoxville, TN (US)

(73) Assignee: MAG USA Inc., Clinton, TN (US)

( * ) Notice: Subject to any disclaimer, the term of this patent is extended or adjusted under 35 U.S.C. 154(b) by 117 days.

(21) Appl. No.: 16/745,723

(22) Filed: Jan. 17, 2020

(65) Prior Publication Data

US 2020/0231228 A1 Jul. 23, 2020

(30) Foreign Application Priority Data

Jan. 17, 2019 (IL) .......................................... 264320

(51) Int. Cl.
*B62D 43/04* (2006.01)
(52) U.S. Cl.
CPC .................. *B62D 43/045* (2013.01)
(58) Field of Classification Search
CPC ......... B62D 43/045; B62D 43/00; B62D 1/11
See application file for complete search history.

(56) References Cited

U.S. PATENT DOCUMENTS

| 4,548,540 A * | 10/1985 | Renfro ................. B62D 43/045 206/304 |
| 5,975,498 A | 11/1999 | Sauner |
| 6,267,546 B1 * | 7/2001 | Oxyer .................. B62D 43/045 254/323 |
| 6,406,000 B1 | 6/2002 | Raz et al. |
| 6,692,216 B2 * | 2/2004 | Reznar ................. B62D 43/045 254/323 |
| 6,871,841 B2 * | 3/2005 | Brestelli .............. B62D 43/045 224/42.23 |
| 8,109,419 B2 | 2/2012 | Khavronine |
| 2002/0040979 A1 * | 4/2002 | Raz .......................... B66D 1/54 254/323 |
| 2006/0045689 A1 * | 3/2006 | Voegeli, Jr. .......... B62D 43/045 414/463 |

* cited by examiner

*Primary Examiner* — Derek J Battisti
(74) *Attorney, Agent, or Firm* — Kelly & Kelley, LLP

(57) ABSTRACT

A device for absorbing shocks of a liftable and lowerable object such as a spare tire includes a reeling device that contains a hoisting cable, the reeling device rotatably attached to the vehicle chassis, an arresting device that under normal conditions prevents the reeling device from rotating relative to the vehicle chassis but enables the reeling device to rotate relative to the vehicle chassis under crash conditions thereby absorbing significant part of the energy of the shock.

14 Claims, 3 Drawing Sheets

CRASH SHOCK ABSORBING DEVICE

FIELD OF THE INVENTION

The present invention relates to a device for securing a lowerable and liftable object to a vehicle, in particular, a spare tire against disconnection from the vehicle during or following accidents, crashes or severe shocks.

BACKGROUND OF THE INVENTION

Spare tires for vehicles are mostly heavy and bulky objects that, in many vehicles, are accommodated below the vehicle body and are secured against the bottom of the vehicle or against a structure carried by elements of the vehicle chassis. Because of their weight and size, vehicle spare tires can rarely be lowered to the ground, nor raised for storage, by hand. For this reason, heavier vehicles are provided with hoisting devices such as winches, by means of which the spare tire is lowered or raised using a steel cable.

Steel cables, however, are liable to snap or break due to a number of causes, all of which are relevant to their use for the above-mentioned purpose: lack of maintenance, corrosion due to exposure to the environment, fatigue due to vibration-enhanced stresses, accidents, crashes, severe shocks, and the like. A hoisting cable failure could cause the spare tire to break loose from the vehicle and should this happen it would seriously endanger other road users behind or alongside it.

A safety device to prevent such accidents is known from U.S. Pat. No. 5,975,498, which provides a device consisting of an additional short cable. In case of main cable failure, the additional cable prevents the tire from breaking loose. However, the device functions well only when the main cable breaks near the object end.

U.S. Pat. No. 6,406,000 discloses a device for securing an upper terminal position of a liftable and lowerable object such a spare tire secured by a cable, wherein a lever and catch mechanism operate to prevent the tire from falling in the event of the cable snapping.

U.S. Pat. No. 8,109,419 discloses a device for absorbing shocks of a liftable and lowerable object such as a spare tire includes a first hoisting cable having a hoist-side end and an object-side end and a hollow cylinder encompassing a folded or coiled length of the first hoisting cable near the object end inside the cylinder. Lower and upper ferrules at the lower and upper ends of the cylinder are held in position by a second auxiliary cable having two ends, each end attached to one of the ferrules, the second auxiliary cable having a smaller tearing strength than the first hoisting cable.

SUMMARY OF THE INVENTION

It is an object of the present invention to provide a device that, in case of an accident will absorb the shock of the crash, and thereby prevent the detachment of a load (e.g. spare tire) from the vehicle.

According to the present invention there is therefore provided a shock absorbing device for absorbing shocks conveyed by an object that is supported by a vehicle, said shock absorbing device being configured for raising and lowering the object relative to a chassis of the vehicle, comprising:

a reeling device that contains a hoisting cable capable of being lowered and raised owing to rotation of the hoisting cable, said reeling device being supported on said chassis for rotation about a pivot connected directly or indirectly to the chassis and having an axis of rotation that is substantially normal to the chassis; and an arresting device that under normal conditions prevents said reeling device from rotating around said pivot, said arresting device being configured to disengage under an applied shock force that is significantly lower than a tearing strength of the hoisting cable so as absorb a component of the shock source and enable said reeling device to rotate around said pivot under crash or shock conditions without causing damage to the hoisting cable.

The process of overcoming the holding force of the arresting device and turning the reeling device around the pivot absorbs a significant part of the energy of the shock.

In some embodiments of the invention there are also provided deformable brackets in the reeling device that are deformed by the crash thus absorbing a further component of the shock energy.

In some embodiments of the invention deformation of the brackets enables an internal cogwheel of an eccentric gear of the reeling device to turn a fraction of a circle and release a portion of the hoisting cable thus absorbing a further component of the energy of the shock.

In some embodiments of the invention there is further provided a retainer for supporting a liftable and lowerable object from below, the retainer being provided with a compression spring having a lower end that rests on the lower stop (e.g. ferrule) of the hoisting cable and an upper end on which the retainer rests; the compression spring being configured to absorb the remaining energy of the shock.

BRIEF DESCRIPTION OF THE DRAWINGS

In order to understand the invention and to see how it may be carried out in practice, embodiments will now be described, by way of non-limiting example only, with reference to the accompanying drawings, in which.

DETAILED DESCRIPTION OF EMBODIMENTS

In the following description of some embodiments, identical components that appear in more than one figure or that share similar functionality will be referenced by identical reference symbols.

Figure 1:
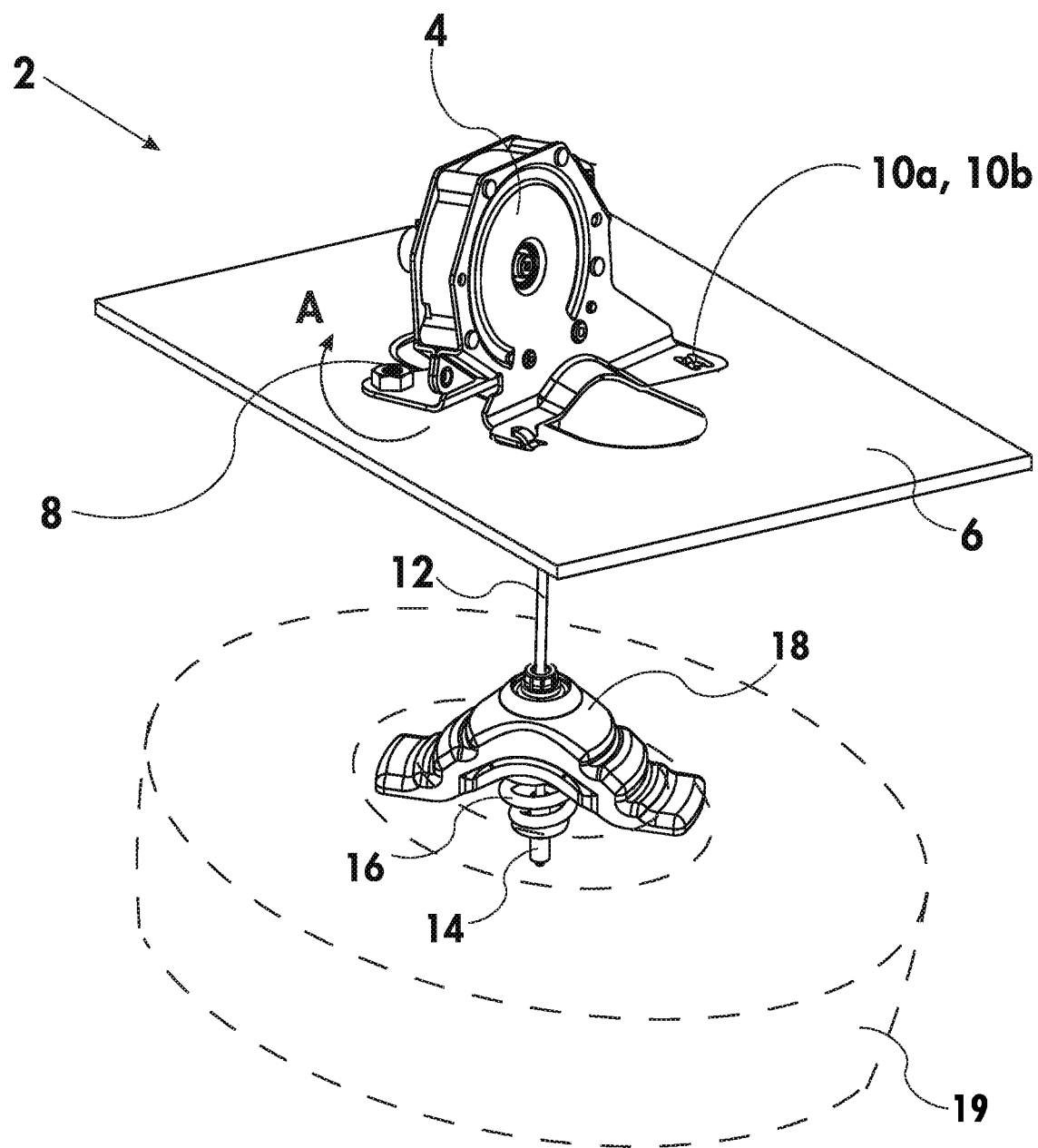
FIG. 1 is a perspective view of a preferred embodiment of the device according to an embodiment of the present invention, at normal state.

Referring now to the drawings, there is shown in FIG. 1 a perspective view of a shock absorbing device 2 according to the present invention, at normal state. A reeling device 4 (containing part of hoisting cable 12) rotatably mounted on a plate 6 by means of a pivot 8 and an arresting device, which is composed of a resilient protrusion 10a depending from a lower surface of the reeling device 4 (shown here) and an aperture or recess or depression 10b formed in the plate 6 and shown in FIG. 2 where the plate 6 schematically represents the vehicle chassis or a structure fastened to the vehicle chassis. A cable 12 is tightly fastened in the ferrule 14 at the cable object end; a compression spring 16 rests on the ferrule 14 via a flange; and a retainer 18, which can support a load such as a spare tire 19, rests on the spring 16.

In the event of a severe shock applied to the reeling device 4 by the spare tire 19 via the retainer 18, the ferrule 14 and the cable 12, the reeling device 4 rotates around the pivot 8 in the direction of arrow A, while overcoming the arresting device 10a, 10b. Since overcoming the arresting device 10a, 10b requires, for example, approximately 400 kg, which is lower than the tearing strength of the cable 12 (e.g., approximately 1500 kg), the cable 12 remains intact following rotation of the reeling device 4. For the sake of abundant clarity, the pivot 8 defines an axis (not shown) that is normal to the plate 6 and the reeling device 4 rotates about the pivot axis. Consequently, a significant part of the shock energy is absorbed by the process of overcoming the arresting device 10a, 10b. Furthermore, as the brackets 22a and 22b (FIG. 3) of the reeling device 4 have lower resistance to deformation than the tearing strength of the cable 12, they may be deformed during or following the rotation thus causing a further component of the energy of the shock to be absorbed by the deformation process. Following the shock, the shock absorbing device 2 takes the form shown by the perspective view in FIG. 2.

Figure 2:
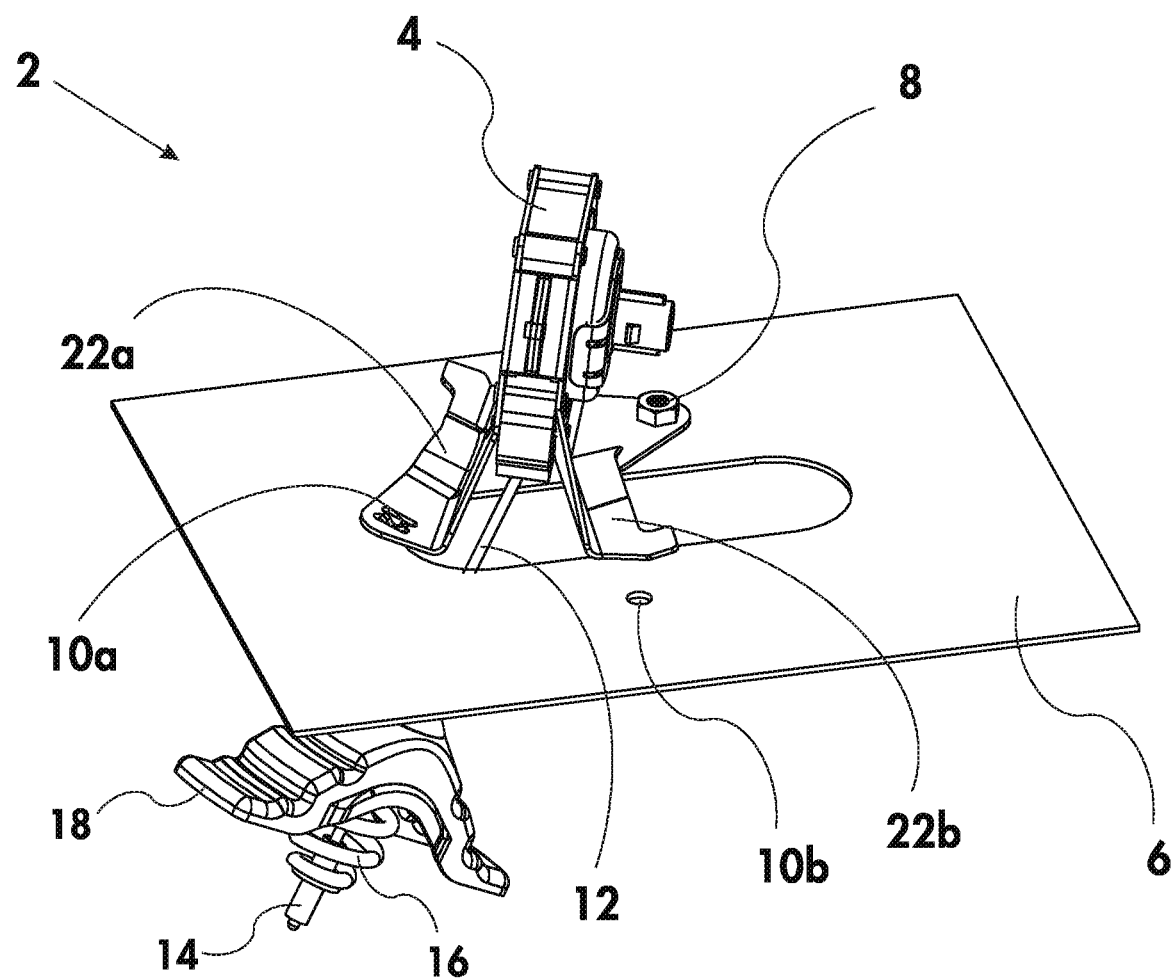
FIG. 2 is a perspective view of a preferred embodiment of the device according to the present invention, at after-shock state.

In FIG. 2 there is shown a perspective view of the device 2, according to the present invention, following severe shock that caused the reeling device 4 to overcome the arresting device 10a, 10b and rotate around the pivot 8, taking the position shown. The deformation of the brackets 22a and 22b is also shown. Furthermore, the spare tire 19 that rests on the retainer 18 accelerates and applies force onto the wheel retainer 18 causing the retainer 18 to compress the spring 16. Consequently, more of the shock energy is absorbed by the spring 16.

Figure 3A:
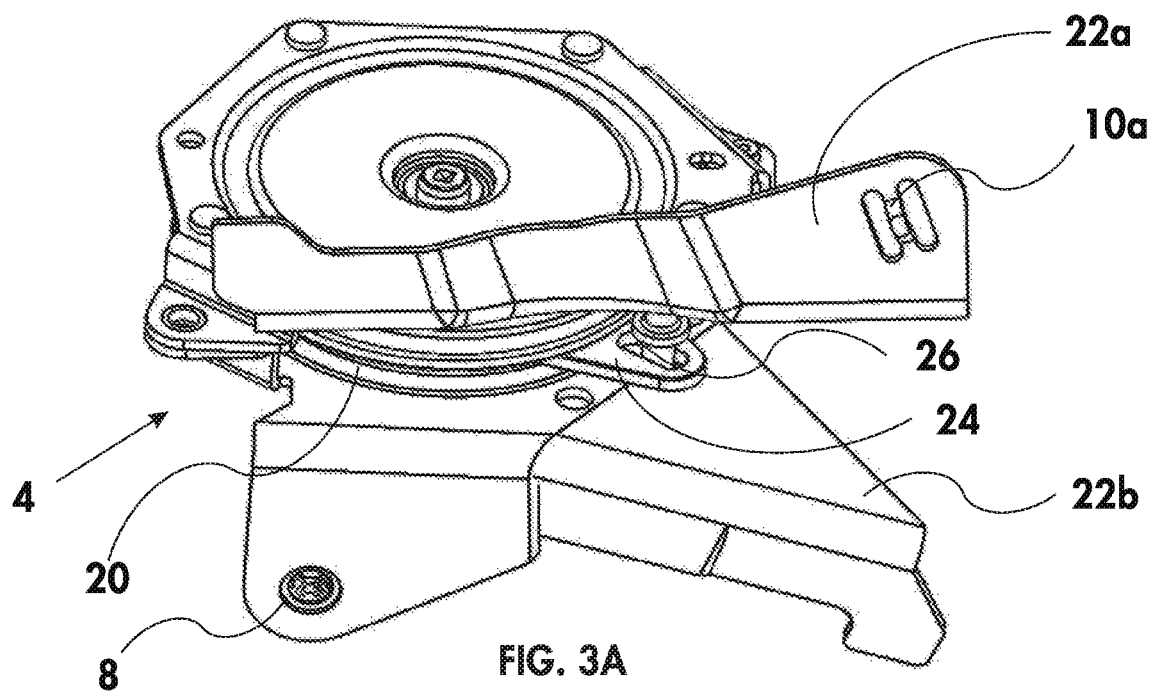
FIG. 3a is a perspective view of a detail of a preferred embodiment of the device according to the present invention, at normal state.
Figure 3B:
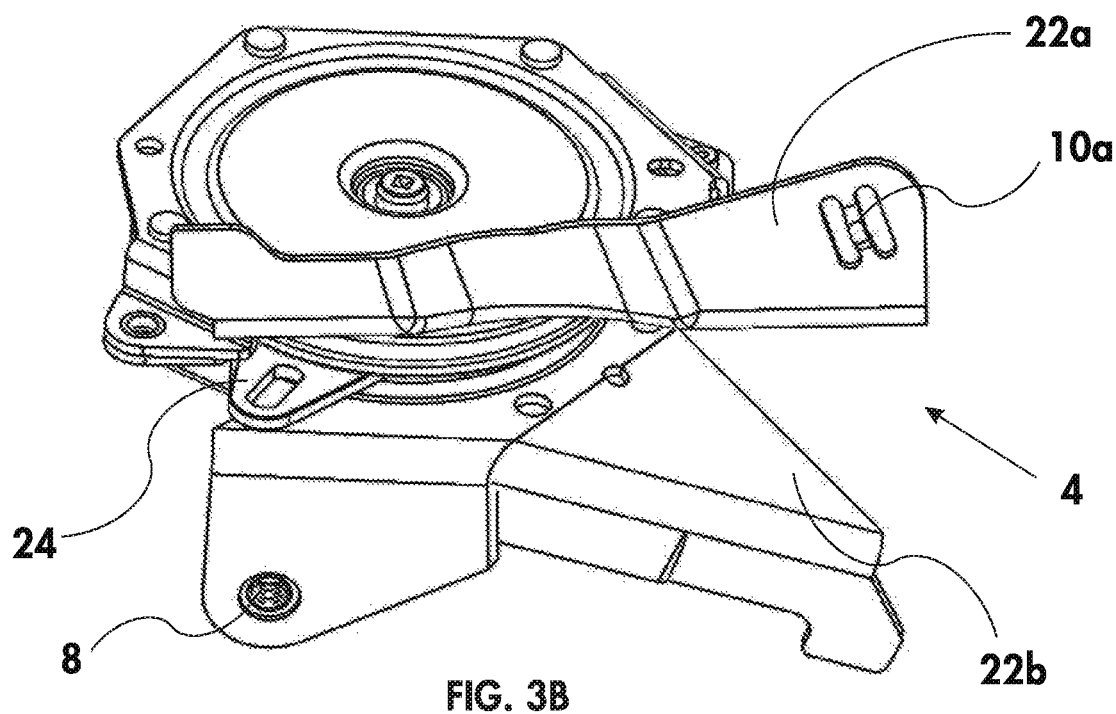
FIG. 3b is a perspective view of the same detail, at after-shock state.

FIGS. 3a and 3b show from below a perspective view of the reeling device 4. It is seen that the reeling device 4 includes a drum 20 (around which part of cable 12 is coiled), brackets 22a and 22b, a cam plate 24 and a pin 26 where the cam plate 24 and the pin 26 relate to an inner cogwheel of an eccentric gear (not shown) included in the reeling device 4. FIG. 3a shows the reeling device 4 at normal state wherein the movement of the cam plate 24 is limited by the pin 26, which is held in position by the brackets 22a and 22b. The cam plate 24 and the pin 26 allow the drum 20 to revolve only when the user activates the hoist.

FIG. 3b shows from below a perspective view of the reeling device 4 at an after-shock state wherein the cam plate 24 has been separated from the pin 26, which fell out from its normal state position due to deformation of the brackets 22a and 22b caused by the shock.

While the cam plate 24 moves away from its normal state position to its after shock position, it enables the drum 20 to revolve a fraction of a circle and to release some length of the cable 12 (FIGS. 1 and 2). The deformation of the brackets 22a and 22b plus the partial release of the cable 12 absorb a substantial part of the shock energy.

Although in the embodiments described above with reference to the drawings, the arresting device is in the form of a resilient protrusion configured to releasably engage an aperture or recess or depression in the vehicle chassis, it will be understood that other forms of arresting device may be employed to achieve the same effect. For example, the arresting device may be constituted by a shearing pin or bolt, or by a bulge on the plate or by frictional contact between a lower surface of the reeling device and the plate.

It will also be appreciated that while the load supported by the retainer 18 is typically a tire, the invention is equally applicable to the support of other loads that are releasably raised and lowered relative to the vehicle chassis.

It should also be noted that features that are described with reference to one or more embodiments are described by way of example rather than by way of limitation to those embodiments. Thus, unless stated otherwise or unless particular combinations are clearly inadmissible, optional features that are described with reference to only some embodiments are assumed to be likewise applicable to all other embodiments also.

The invention claimed is:

1. A shock absorbing device for absorbing shocks conveyed by an object that is supported by a vehicle, said shock absorbing device being configured for raising and lowering the object relative to a chassis of the vehicle, comprising:
   a reeling device that contains a hoisting cable capable of being lowered and raised owing to rotation of the hoisting cable, said reeling device being supported on said chassis for rotation about a pivot connected directly or indirectly to the chassis and having an axis of rotation that is substantially normal to the chassis; and
   an arresting device that under normal conditions prevents said reeling device from rotating around said pivot, said arresting device being configured to disengage under an applied shock force that is lower than a tearing strength of the hoisting cable so as absorb a component of the shock force and enable said reeling device to rotate around said pivot under crash or shock conditions without causing damage to the hoisting cable.

2. The device claimed in claim 1, wherein said reeling device is configured to be deformed under crash or shock conditions and release a portion of the hoisting cable subsequent to rotation around said pivot.

3. The device claimed in claim 1, further comprising:
   a retainer for supporting said object from below; and
   a compression spring having a lower end that rests on a lower stop of said cable and an upper end on which said retainer rests.

4. The device claimed in claim 2, further comprising:
   a retainer for supporting said object from below; and
   a compression spring having a lower end that rests on a lower stop of said cable and an upper end on which said retainer rests.

5. The device claimed in claim 1, wherein said object is a spare vehicle tire.

6. The device claimed in claim 2, wherein said object is a spare vehicle tire.

7. The device claimed in claim 3, wherein said object is a spare vehicle tire.

8. The device claimed in claim 4, wherein said object is a spare vehicle tire.

9. The device claimed in claim 1, wherein the reeling device includes:
   a drum around which part of the hoisting cable is coiled,
   a cam plate and a pin which co-operate to allow the drum to revolve only when manually activated, and
   a pair of brackets that retain the pin so as to prevent rotation of the drum under normal conditions.

10. The device claimed in claim 9, wherein:
   the brackets are configured to undergo deformation under a shock thereby releasing the pin and causing the cam plate to move from an initial position to enable the drum to revolve a fraction of a circle and to allow partial release of the hoisting cable, and said deformation of the brackets and partial release of the hoisting cable absorb a substantial part of the shock force.

11. The device claimed in claim 1, wherein the reeling device includes:
   a drum around which part of the hoisting cable is coiled,
   a bracket attached to an outer surface of the drum and having a flange that is rotatably fixed to the chassis by said pivot so as to allow rotation of the reeling device about the pivot.

12. The device claimed in claim 1, wherein the reeling device includes:
   a drum around which part of the hoisting cable is coiled,
   a bracket attached to an outer surface of the drum and having a flange that supports the arrester device.

13. The device claimed in claim 9, wherein the brackets include:
   a first bracket attached to an outer surface of the drum and having a flange that is rotatably fixed to the chassis by said pivot so as to allow rotation of the reeling device about the pivot, and
   a second bracket attached to an outer side surface of the drum and having a flange that supports the arrester device.

14. The device claimed in claim 13, wherein the first and second brackets are attached to opposite side surfaces of the drum.

* * * * *